US012730700B2

(12) United States Patent
Starr et al.

(10) Patent No.: US 12,730,700 B2
(45) Date of Patent: Sep. 8, 2026

(54) REMOTE TERMINAL UNIT (RTU) FOR SUPERVISORY CONTROL AND DATA ACQUISITION (SCADA) SYSTEM

(71) Applicant: High Tide Technologies, LLC, Nashville, TN (US)

(72) Inventors: Justin Starr, Nashville, TN (US); Stephen Kemp, Nashville, TN (US); Bryan Mundie, Nashville, TN (US); Dave Mundie, Nashville, TN (US); Ian Parker Hodge, Nashville, TN (US); Eric Winton, Nashville, TN (US); Sarah Beckum, Nashville, TN (US); Antonio Kincaid-Rivadeneyra, Nashville, TN (US)

(73) Assignee: High Tide Technologies, LLC, Nashville, TN (US)

( * ) Notice: Subject to any disclaimer, the term of this patent is extended or adjusted under 35 U.S.C. 154(b) by 0 days.

(21) Appl. No.: 18/758,774

(22) Filed: Jun. 28, 2024

(65) Prior Publication Data

US 2026/0003720 A1 Jan. 1, 2026

(51) Int. Cl.
*G06F 11/07* (2006.01)

(52) U.S. Cl.
CPC ........ *G06F 11/079* (2013.01); *G06F 11/0709* (2013.01); *G06F 11/0793* (2013.01)

(58) Field of Classification Search
CPC ............. G06F 11/0706; G06F 11/0709; G06F 11/079; G06F 11/0793
See application file for complete search history.

(56) References Cited

U.S. PATENT DOCUMENTS

| | | | | |
|---|---|---|---|---|
| 7,814,369 | B2 * | 10/2010 | McCroskey | G06F 11/006 714/26 |
| 9,836,426 | B2 * | 12/2017 | Zou | G06F 21/6218 |
| 10,037,238 | B2 * | 7/2018 | Bikumala | G06F 11/0706 |
| 11,100,064 | B2 * | 8/2021 | Dwarampudi | G06F 8/656 |
| 11,249,833 | B2 * | 2/2022 | Singh | G06F 11/302 |
| 11,954,216 | B1 * | 4/2024 | Markle | G06F 21/6218 |

* cited by examiner

*Primary Examiner* — Joseph R Kudirka
(74) *Attorney, Agent, or Firm* — Andrew M Gabriel

(57) ABSTRACT

An embodiment provides for error analysis and remediation of one or more remote terminal units (RTUs) of a supervisory control and data acquisition (SCADA) system. In one example, a method determines an error associated with an RTU and generates one or more error messages. An error code of the one or more error message is extracted to identify an error type and the error type is associated with analytics data indicative of the error. In some examples, the error is an update error that can be analyzed to trigger a remediation workflow, for example to attempt to retry an update workflow with modified configurations.

20 Claims, 10 Drawing Sheets

REMOTE TERMINAL UNIT (RTU) FOR SUPERVISORY CONTROL AND DATA ACQUISITION (SCADA) SYSTEM

BACKGROUND

Supervisory Control and Data Acquisition (SCADA) systems provide a control architecture for a network of industrial machines and related devices such as switches, pumps or gates, as well as sensors (collectively "industrial machines"). For example, in water and wastewater management collection and treatment systems, a SCADA system may control a variety of industrial machines using a controller in the nature of a programmable logic controller (PLC) that interfaces with an industrial machine such as a water pump, as well as a variety of sensors, such as water level sensors, that are used to collect monitoring data, such as water level, flow rate, device or industrial machine state, and the like.

Conventionally, SCADA systems include one or more controllers or computers that receive monitoring data from sensors and communicate control instructions to the networked industrial machines. One example of a network of devices is a PLC network, with PLCs forming interfaces with industrial machines. In some examples, one or more remote terminal or telemetry units (RTUs) provide the interface to the PLC network, and one or more central controllers, for example a cloud computing device or server, communicate instructions via the one or more RTUs to control the industrial machines.

BRIEF SUMMARY

One problem that arises in the context of controlling a large and functionally diverse set of industrial machines is managing control for a large variety of error types that often change. By way of example, a water utility may manage a large set of geographically distributed industrial machines and related equipment or devices, such as water towers, water lift stations, water level sensors, flow sensors, water pumps, valves, etc., associated with water collection and wastewater treatment installations. The water utility may subsequently come into control of a new territory such as a new county or municipality, where a different but related set of industrial machines are to be controlled by addition to the existing network.

These new industrial machines may represent a diverse set of new device types, for example providing differently formatted outputs such as error codes, requiring or accepting differently formatted inputs, and requiring different communication types to be utilized. Consequently, even when a water utility (or similarly situated entity) adopts a cloud-based supervisory control and data acquisition (SCADA) system and flexible set of remote terminal units (RTUs), the operator of the cloud-based SCADA system may face a large set of error types or codes reported by RTUs, many of which have not been seen by the cloud-based SCADA operator before, for example a set of error codes reported by a large and diverse set of new or different industrial machines.

An embodiment therefore provides for more convenient error reporting, analysis and remediation. Such techniques are used to assist in appropriate and timely error reporting, comprehensive error analysis and visualization, as well as facilitating remediation.

In summary, an embodiment provides a method for error analysis and remediation of one or more remote terminal units (RTUs) of a supervisory control and data acquisition (SCADA) system, comprising: determining, using a set of one or more processors, an error associated with an RTU; generating, using the set of one or more processors, one or more error messages; extracting, using the set of one or more processors, an error code of the one or more error messages to identify an error type; and associating, using the set of one or more processors, the error type with analytics data indicative of the error.

Another embodiment provides a system for error analysis and remediation of one or more remote terminal units (RTUs) of a supervisory control and data acquisition (SCADA) system, comprising: a set of one or more processors; and a memory storing code executable by the one or more processors to: determine an error associated with an RTU; generate one or more error messages; extract an error code of the one or more error message to identify an error type; and associate the error type with analytics data indicative of the error.

A further embodiment provides a computer program product for error analysis and remediation of one or more remote terminal units (RTUs) of a supervisory control and data acquisition (SCADA) system, comprising: a memory storing code executable by one or more processors to: determine an error associated with an RTU; generate one or more error messages; extract an error code of the one or more error message to identify an error type; and associate the error type with analytics data indicative of the error.

The foregoing is a summary and is not intended to be in any way limiting. For a better understanding of the example embodiments, reference can be made to the detailed description and the drawings. The scope of the invention is defined by the claims.

DETAILED DESCRIPTION

Figure 1:
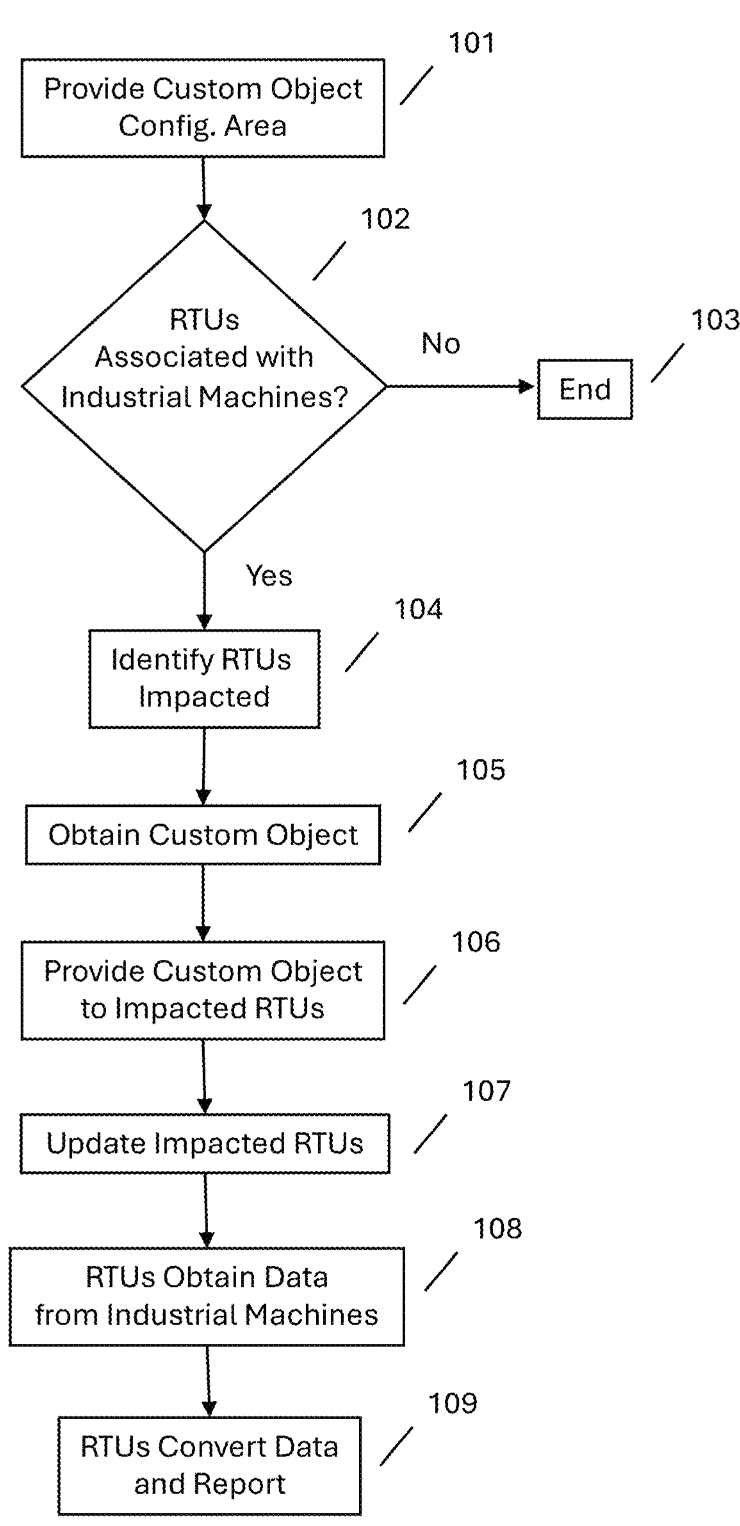
FIG. 1 illustrates an example method according to an embodiment.

It will be readily understood that the components of the embodiments, as generally described and illustrated in the figures herein, may be arranged and designed in a wide variety of ways in addition to the examples described herein.

The detailed description uses examples, represented in the figures, but these examples are not intended to limit the scope of the claims.

Reference throughout this specification to "embodiment(s)" (or the like) means that a particular described feature or characteristic is included in that example. The described feature or characteristic may or may not be claimed. The described feature may or may not be relevant to other embodiments. For the purpose of this detailed description, each example might be separable from or combined with another example, i.e., one example is not necessarily relevant to other examples, but combinations of embodiments are expected in some cases consistent with the examples described throughout.

Therefore, the described features or characteristics of the examples generally may be combined in any suitable manner, although this is not required. In the detailed description, numerous specific details are provided to give a thorough understanding of example embodiments. One skilled in the relevant art will recognize, however, that the claims can be practiced without one or more of the specific details found in the detailed description, or the claims can be practiced with other methods, components, etc. In some instances, well-known details are not shown or described to avoid obfuscation.

The various described embodiments provide or operate in conjunction with a supervisory control and data acquisition (SCADA) system, which may be implemented at least in part by a cloud computing device or other server device, which includes logic and processing of a centralized control and display system as described throughout. In an embodiment, a method of configuring or updating a subset of RTUs is provided. In an embodiment, the RTUs may be configured with one or more custom objects that permit different or additional functionality, for example the ability to interface with one or more industrial machines in an installation site. An embodiment provides for error reporting, analysis and/or remediation, for example for errors encountered when updating an RTU.

Existing RTUs often face limitations in their communication capabilities. Many RTUs are restricted to a single cellular network carrier, which can hinder their flexibility and adaptability in various operational environments. Additionally, conventional RTUs may struggle with managing a large variety of event types and maintaining control over diverse sets of industrial machines, especially when new territories or different sets of industrial machines are integrated into the existing network.

In an embodiment, an RTU addresses these challenges by providing enhanced communication capabilities and improved flexibility in managing diverse industrial machines. In an embodiment, the RTU features a controller, such as a Renesas S5D9 microcontroller, with increased flash and random access memory (RAM), operating using a real-time operating system (RTOS), such as the ThreadX RTOS. This configuration allows for better event orchestration and memory management, ensuring timely data acquisition and control. In an embodiment, the RTU supports a modular package, enabling easy integration of additional functionalities that may be added and called by a RTOS as needed.

In an embodiment, the RTU main board supports multiple digital and analog inputs and outputs, for example 8 or 12 digital inputs, 4 digital outputs, 4 analog inputs, with the capability to expand up to 256 digital inputs and 32 analog inputs, for example using expander IO board(s). For example, in an embodiment an RTU can connect to a network of expander IO boards over I2C and supports various Modbus modes, including RS485, RS232, and TCP, allowing for flexible and reliable data polling. In an embodiment, the RTU may maintain a connection to a cloud-based SCADA system in a low power mode, removing a need to program a wake and sleep cycle to facilitate communication. Additionally, the RTU can function on a PCT as a master of the network, providing robust support for initiating and responding to API requests of other devices on the PLC network.

In an embodiment, the RTU is highly programmable to accommodate different use contexts. For example, an embodiment may seamlessly join an existing PLC network by accepting and using a predetermined (assigned) IP address from an existing (e.g., customer) device, such as a router or similar. This permits a customer to know the address of a new RTU in advance of it joining the PLC network.

An embodiment allows for the precise determination of errors at an RTU using a set of one or more processors, for example resident in a cloud-based SCADA system. This ensures that errors are identified accurately and promptly, which may be important for maintaining the reliability and efficiency of the SCADA system, particularly in a context in which an RTU needs to be customized to integrate into existing PLC networks and interface with a variety of legacy industrial machine types, for example when a water utility takes on a new territory with existing equipment in place. For example, by generating one or more error messages, an RTU provides a systematic way to document and communicate errors. This facilitates quicker diagnosis and resolution of issues, thereby minimizing downtime and operational disruptions. In an embodiment, by obtaining error messages from a queue, such as at the RTU or other SCADA system device, and extracting error codes, the process of error analysis and remediation is streamlined to ensure that error information is readily available for analysis, reducing the time and effort required to identify the root cause of the error.

In an embodiment, by extracting error codes and associating them with analytics data indicative of the error, the method enables a thorough analysis of error types. This helps in understanding the underlying issues and implementing effective remediation strategies. The ability to identify and analyze errors accurately contributes to the overall reliability and robustness of the SCADA system. This assists the system in operating efficiently even in the presence of diverse and complex industrial machines that generate diverse error types, some of which may not be familiar to SCADA operators or reviewing users. Further, in an embodiment, a capability to generate and analyze error messages allows for proactive maintenance of RTUs. This helps in anticipating potential issues and addressing them before they escalate, thereby extending the lifespan of the RTUs, related industrial machines, etc., and reducing maintenance costs.

Figure 2:
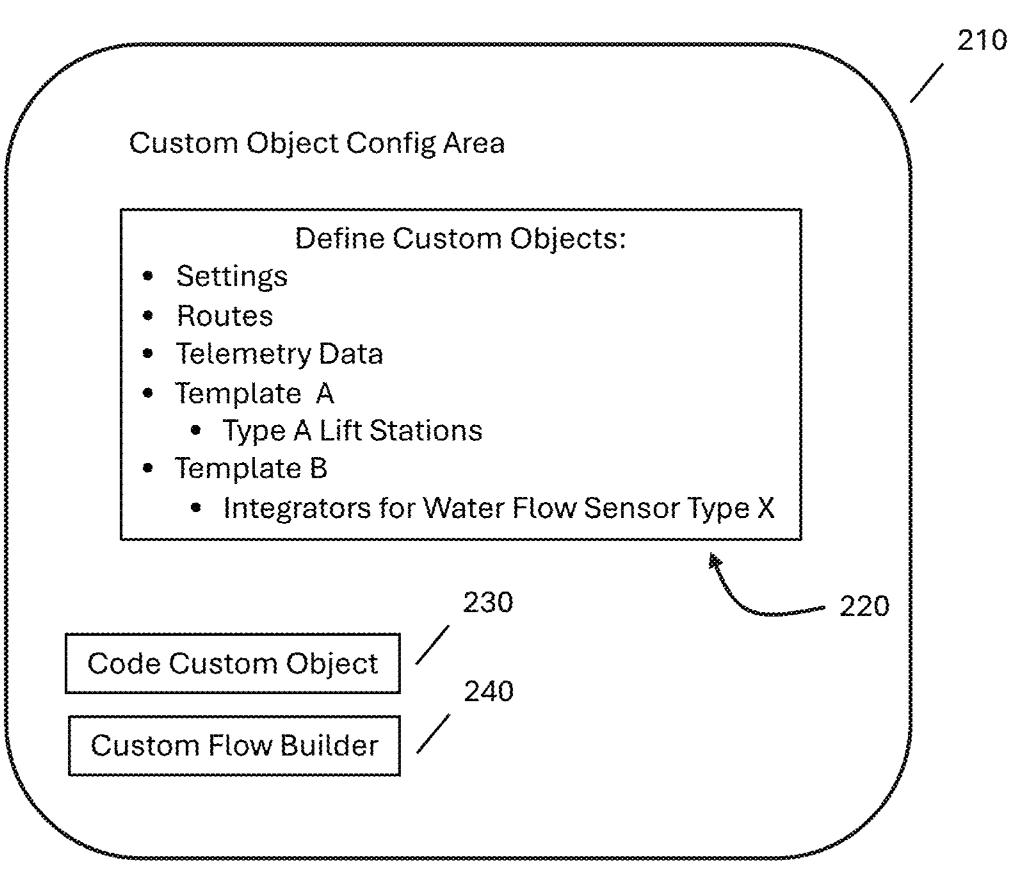
FIG. 2 illustrates an example custom object configuration area according to an embodiment.

Referring to FIG. 1, an embodiment provides a method for remotely configuring one or more remote terminal units (RTUs) of a supervisory control and data acquisition (SCADA) system. As indicated at 101, in an embodiment the method includes providing, using a graphical user interface (GUI), a configuration area in which to specify one or more configurations that define a custom object for one or more RTUs associated with a type of one or more industrial machines. An example configuration area is illustrated in FIG. 2. In one example, the providing of a configuration area at 101 affords a GUI for indicating one of a plurality of template types for the custom object to be configured. For example, each of the plurality of template types may include one or more predetermined configurations for an operational scenario or an industrial machine type and one or more configurable values. This permits a user to rapidly configure a custom object based on a set of suggested default values, for example matched to an operational scenario such as integrating a new installation type, for example a known type of lift station, set of sensor types, etc.

The custom objects are sometimes developed for unique situations, for example based on a customer request, and thus a given template may not directly fit all similar operational scenarios encountered by a subsequent user. A user may change the one or more configurable values via user input to the configuration area, for example to accommodate a particular operational scenario, device type, reporting need, new threshold, etc. This permits the custom object to be defined by the user. In one example, the custom object configuration area may be provided in the form of a GUI that accepts configurations for defining the custom object, e.g., via drop-down selections, alphanumeric entry boxes, etc. As further described herein, the custom object area provided at 101 may include a coding 230 and workflow area 240.

As illustrated in FIG. 1, a method may include identifying, using a set of one or more processors of a cloud computing system, a subset of the one or more RTUs associated with the type of one or more industrial machines at 102 and 104. For example, a SCADA control program may identify one or more RTUs that are logically associated with a type of industrial machine, for example an RTU physically located with or assigned to a given type of industrial machine or installation. The identification at 102 may permit, for example, identification of impacted RTUs that are to be configured to receive and use a deployed custom object, such as an RTU installed to interface with a newly acquired lift station or similar. If one or more RTUs are identified, these may be targeted to receive the custom object being defined by a user. In addition or alternatively, a user may create a custom object prior to any RTUs being associated therewith, as indicated at 103. In such a case, the custom object may be stored in the cloud system or other repository for later reference, selection, further customization, etc.

An embodiment obtains at 105, using the set of one or more processors, the custom object defined by the one or more configurations. For example, the custom object defined using the configuration area provided at 101 may be obtained from a code repository or other storage area as a software package or firmware update. This permits the custom object to be provided or deployed at 106 using the set of one or more processors to the subset of the one or more RTUs associated with the type of one or more industrial machines. By way of example, a custom object may be provided to an RTU at 106 by a wireless communication received as an over the air update by a cellular subsystem of the RTU. Similarly, an RTU may be provided with a custom object at 106 via a wired connection, such as via an ethernet port.

In an embodiment, the method includes updating, at 107, the subset of the one or more RTUs to interface with the type of one or more industrial machines using the custom object. For example, the RTU may receive the custom object as a module of executable code via an over the air update and store it in a cellular subsystem of the RTU, for example in a flash memory of the RTU in the form of an SD card. The receipt of the custom object by an RTU permits the RTU to gain or change functionality, for example with respect to interfacing with a given industrial machine type.

As illustrated in FIG. 1, a method may include obtaining, via the subset of one or more RTUs, data from the type of one or more industrial machines using the custom object at 108 and thereafter converting at 109, via the subset of one or more RTUs, the data from the type of one or more industrial machines to another type using the custom object. For example, a custom object may be used to set an analog threshold for an industrial machine sensor input, such as water level or flow, converting it to a digital output when a user-configured threshold is reached.

Referring to FIG. 2, an embodiment provides a custom object configuration area 210. In the example illustrated, custom object configuration area 210 is provided in the form of a GUI in which a user may review and select or indicate configurations defining a custom object. Custom object configuration area 210 may be provided, for example, via a browser program that displays a cloud application interface for a cloud computing device of a SCADA system.

Custom object configuration area 210 may provide a section for quickly defining and configuring a custom object, for example via no-code selection area 220. By way of example, a user may interface with custom object configuration area 210 to make selections, e.g., using radio buttons, drop down menu, etc. In one example, a user may select from predefined templates for custom objects, for example a template A for a type A lift station, a template B for integrators for a water flow sensor type B, etc. In other words, templates may include predefined configurations for updating an RTU to operate in conjunction with a given type of industrial machine or installation in an operational scenario defined by the template.

As described herein, a user may change or modify the custom object configuration to suit a given operational scenario or purpose, such as selection of data format, communication channel, thresholds used, input types used, output types produced, integration points for workflows, etc. This may be facilitated by providing templates with suggested default data types, conversions, calculations, etc. Further, as illustrated in FIG. 2, an embodiment may afford a user, such as a developer, with an option to fully code a new custom object or refine a previously coded object, for example using interface element 230. Likewise, a user may include or incorporate a custom object in a workflow that links modular code blocks together, such as a monitoring, control, or reporting workflow. In the example of FIG. 2, a user may use an interface element to access a custom flow builder, as indicated at 240. The custom flow builder may allow a user to link or logically connect one or more graphical elements representing coded functionality together into the workflow, such as linking an industrial machine to an RTU, a custom object of the RTU to a reporting object of a cloud-based system, etc.

Figure 3:
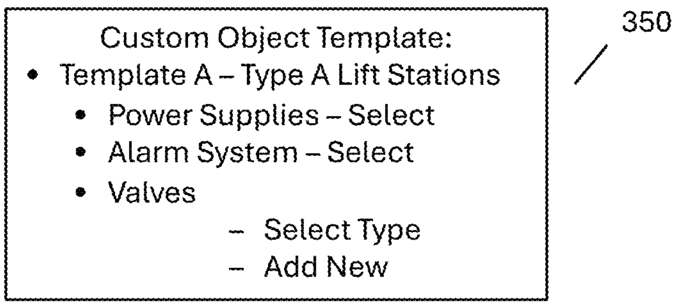
FIG. 3 illustrates an example custom object template according to an embodiment.

As shown in FIG. 3, an embodiment may provide one or more custom object templates 350 for creating or defining custom objects. By way of example, configuration area 210 provides an area 220 for indicating one of a plurality of template types for the custom object to be configured. In an embodiment, each of the plurality of template types comprise a custom object template 350 that may include one or more predetermined configurations for an operational scenario or an industrial machine type and one or more configurable values. By way of example, custom object template 350 may be displayed responsive to a user selection in area 220 and include one or more predetermined configurations comprising one or more of: an analog threshold, an analog as digital converter, a digital output controller, an integrator, a flow rate calculation, etc.

In the illustrated example custom object template 350 a template A is provided for a type A lift station. Such a template may correspond to custom logic and values for using an RTU to monitor and control a type A lift station and its associated valves, pumps, etc., which may require logic for converting data format, units, etc., or to configure communication channels such as wireless connection type, wired connection type, etc., to interoperate and communicate effectively with a larger SCADA system. In the example template 350, a series of configurable default types and values are provided, for example power supply types may be selected, alarm system types may be selected, valve types may be selected, etc., each with default configurations suggested for the user, which can be modified. Further, custom object template may include an area for defining new or different functionality, for example to accommodate a legacy equipment type or data type not supplied as a default in the custom object template 350. Any changes made by the user may be stored, for example as an updated version of custom object template 350, facilitating its addition to a repository of selectable custom object templates or custom objects, for example used in a development process or presented to a subsequent user in custom object configuration area 210.

Figure 4:
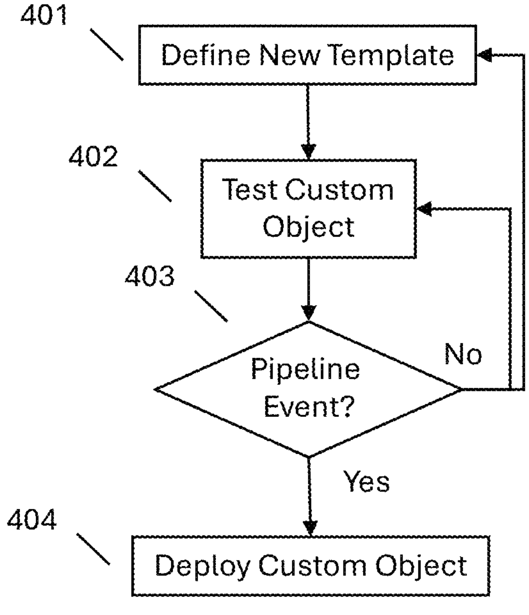
FIG. 4 illustrates an example development and update process according to an embodiment.

By way of example, illustrated in FIG. 4 is a development and update process according to an embodiment. As illustrated, a user may define a new template at 401, for example, updating an existing custom object template, such as custom object template 350 of FIG. 3. The new template defined at 401 may be stored for testing as indicated at 402, for example deployed to a test environment such as an RTU to confirm the custom object's functionality is as expected. Thereafter, an automation or trigger event such as a pipeline stage event may be determined at 403, for example confirmation that the new template defined at 401 is acceptable, a manual promotion input, etc. Thereafter, the custom object defined using the new template may be deployed at 404, for example to a production subset of RTUs interfacing with a type on industrial machines associated with the custom object.

Figure 5:
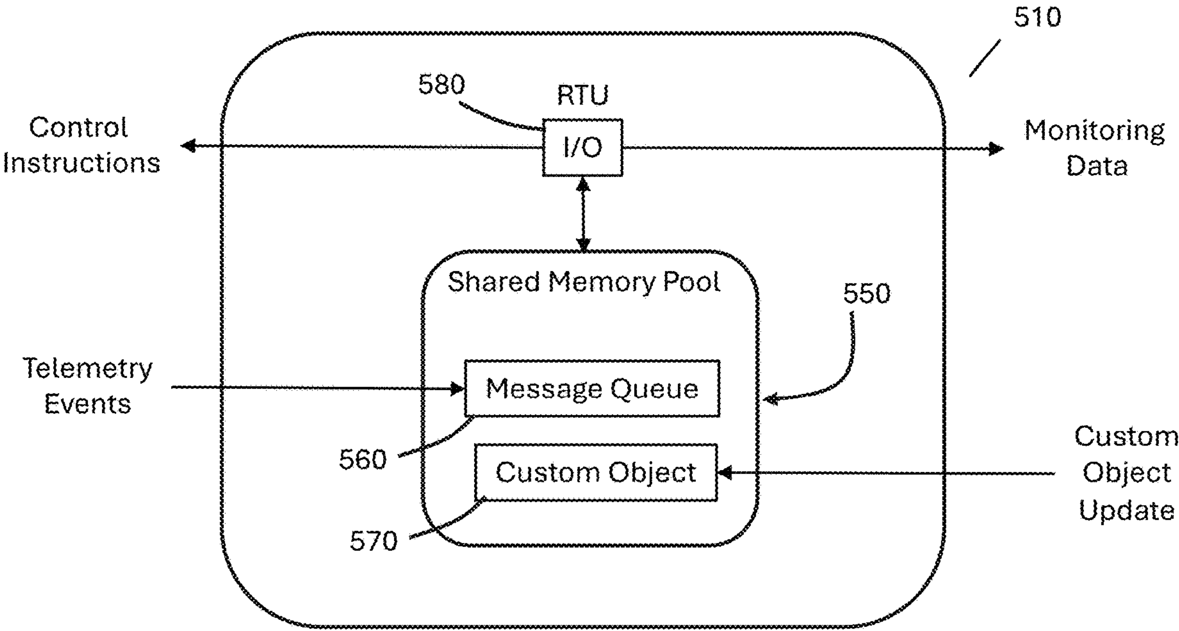
FIG. 5 illustrates an example RTU according to an embodiment.

Referring to FIG. 5, an RTU 510 of an embodiment may be configured to interface with one or more industrial machines, for example to receive telemetry event data therefrom and communicate control instructions thereto, for example using an input/output (I/O) subsystem 580. In an embodiment, RTU 510 is configured to use a messaging queue 560 for example implemented in a shared memory pool 550. Messaging queue 560 may be utilized to temporarily store message data, for example telemetry event data in the form of sensor data converted from an analog output of an industrial machine into digital format, which is formatted as monitoring data, reported to or obtained by a cloud computing device of SCADA system. In an embodiment, custom object 570 may perform some or all of the conversion and formatting of message to make it suitable for use in reporting a cloud-based SCADA system.

RTU 510 may receive and store a custom object 570 for use in communicating with an industrial machine type, as described herein. In one example, updating or RTU 510 comprises using shared memory pool 550 to store custom object 570, where the shared memory pool 550 includes message queue 560 for one or more telemetry event messages generated from one or more industrial machines. In RTU 510, memory pool 550 may be limited in size and therefore may need to be managed in terms of providing custom object 570 thereto. For example, RTU 510 may be transitioned to a lower power mode prior to communicating custom object 570 to RTU 510. In an embodiment, shared memory pool 550 may be configured such that the updating of RTU 510 with custom object 570 is interrupted by receipt of the one or more telemetry event messages. Such an error may be determined, for example, by receipt of error log data indicative of the same. An embodiment may store error log data, for example to an SD card of RTU 510, and communicate log data to a cloud device, the log data relating to interruption of the updating. The log data may be analyzed to determine a nature of the error, for example based on an error code associated with the log data such as loss of power, a time-based analysis associating the custom object update and a telemetry message, etc. Therefore, an embodiment may use the log data to identify an error type and indicate the error type. A user may review such information in connection with creating custom objects for monitoring and controlling industrial machines using a cloud-based SCADA system and more generally to monitor the updating process and perform error analysis.

Figure 6:
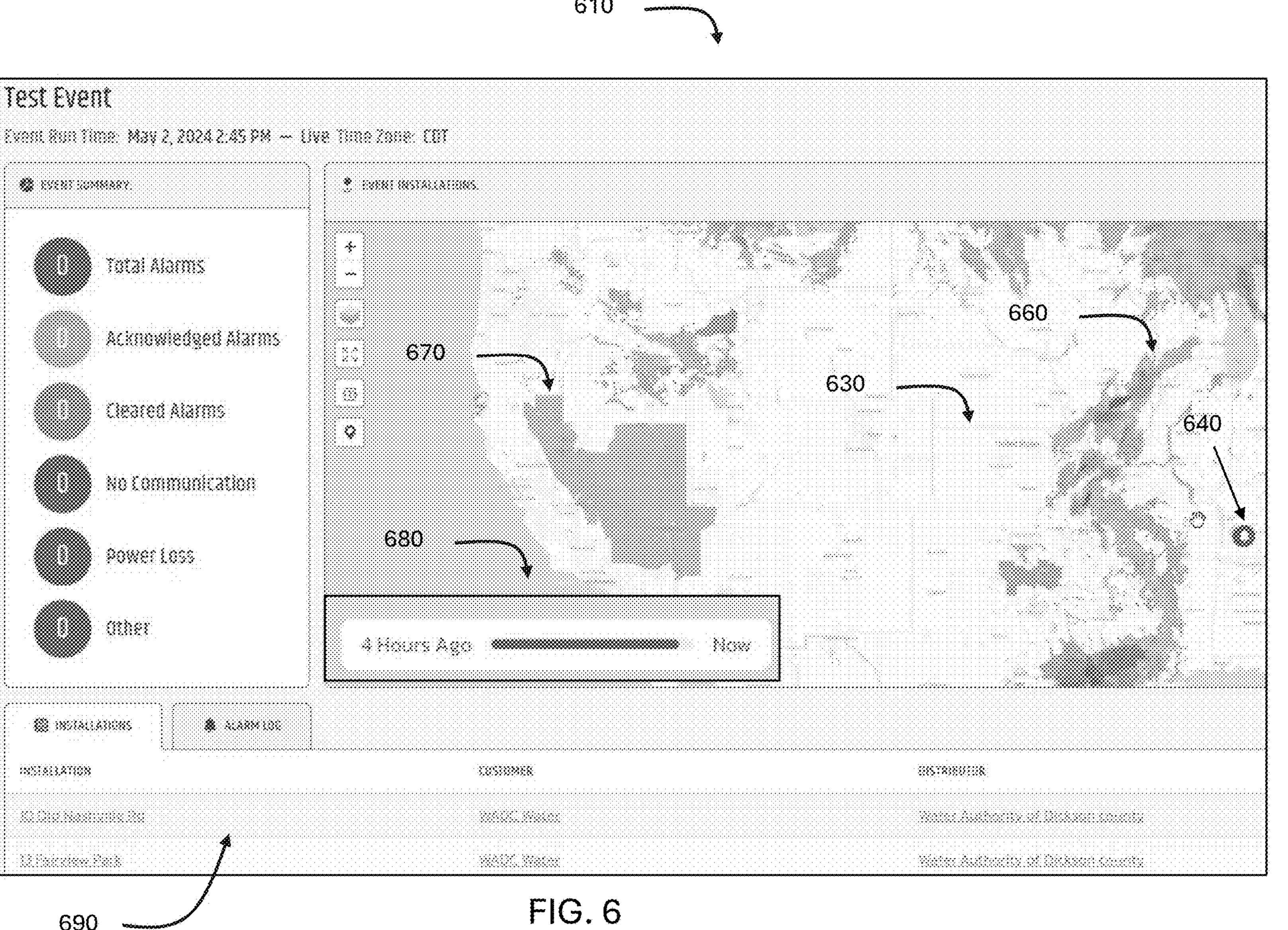
FIG. 6 illustrates example combined display according to an embodiment.

Among various views offered by a cloud-based SCADA system, FIG. 6 illustrates an example combined display according to an embodiment. In the view illustrated in FIG. 6, a GUI 610 provides an interactive combined display in which data such as map data 630 and monitoring data 640 is provided. Indications of monitoring data 640 of industrial machines (or installations sites) may be visually or otherwise distinguished, for example using different colors to distinguish alarm and normal monitoring data. The types or categories of monitoring data may be provided in a graphic, as indicated.

Illustrated in FIG. 6 is a view in which map data 630 is associated with monitoring data 640. FIG. 6 illustrates that there are various types of external contextual data 660, 670, included in the combined display of GUI 610*a*. Map data 630 is overlaid with external contextual data 660 in the form of radar data and includes other external contextual data 670 such as weather advisory data (e.g., weather alerts, watches, or warnings). Certain contextual data, e.g., 630 for example, is provided as an animation along a predetermined time as shown at 680, noting that the predetermined time may be programmatically determined or changed, for example via a determination formed from a tracking program. By way of example, the predetermined time of the animation may be altered based on a look ahead period configured in a tracking program, allowing for radar or various other types of external contextual data projections to be included in combined display for a tracked set of industrial machines.

Also shown in the combined display of FIG. 6 is monitoring data 690, which presents categorized types of monitoring data, for example organizing alarms into a tabbed section of the UI. Thus, GUI 610 permits a user to readily access alarms reported from the monitored subset of industrial machines configured to be tracked using a tracking program. The facilitates threshold or other automation-based workflows, for example sending an alert message to a field technician once a predetermined percentage of the tracked installations are in an alarm state, etc. Likewise, control instructions for operating the industrial machines may also be coordinated or orchestrated in a manual, semi-automated, or automated fashion using such data as an input. By way of example, a user may configure a tracking and/or control program to monitor a set of tracked industrial machines in relation to a storm event. As such, historical and/or projected storm data from an external contextual data source may supply the user with advanced notice and ongoing context of the storm's expected impact on alarm states of monitored industrial machines. In a workflow, a user may issue notifications to field technicians once a first threshold of industrial machines is impacted in the alarm state or projected to be in an alarm state, and issue control instructions to industrial machines once a second, higher threshold of industrial machines is or is expected to be in an alarm state, for example to mitigate rising or expected flood water due to a storm.

Figure 7:
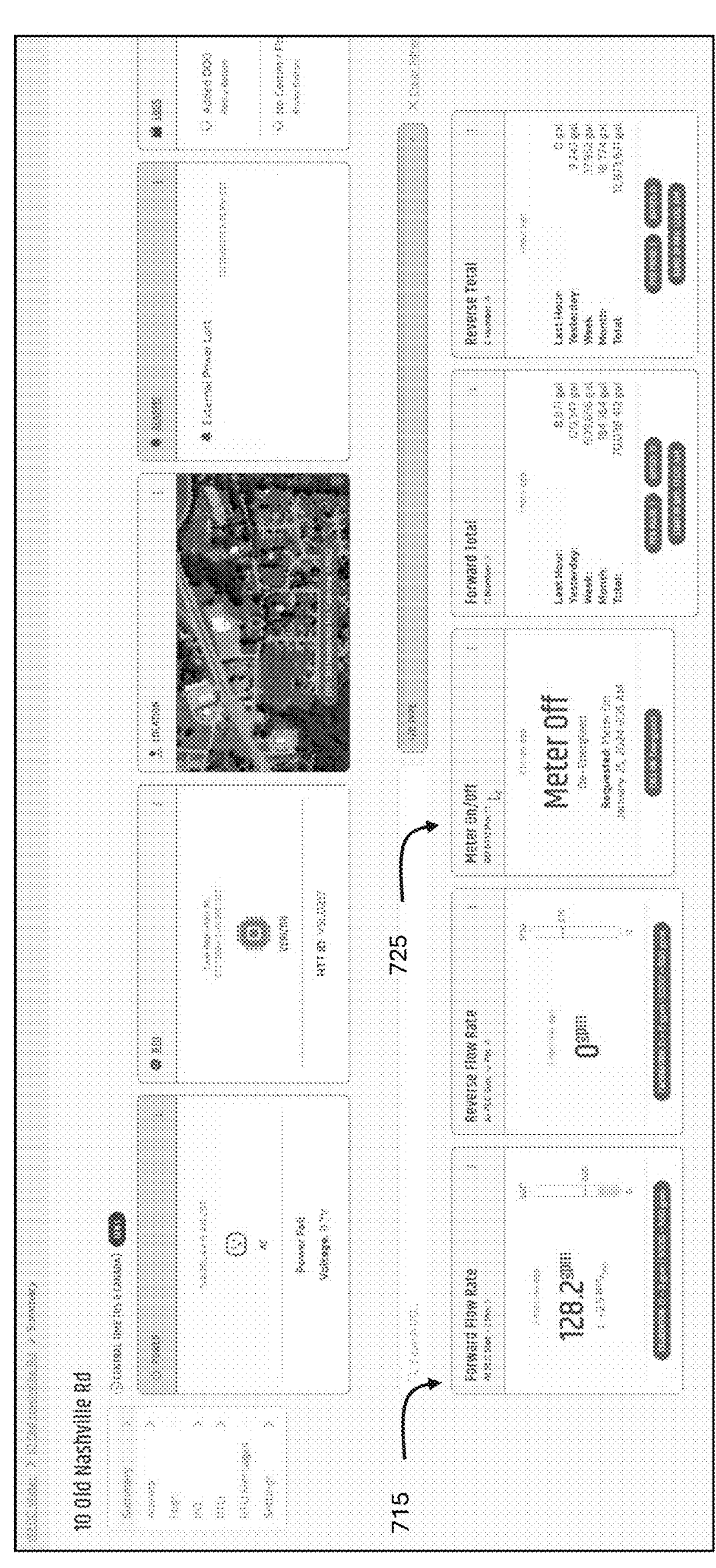
FIG. 7 illustrates an example dashboard according to an embodiment.

Turning to FIG. 7, illustrated are examples of a dashboard and dashboard components or objects according to an embodiment. In an embodiment, the platform presents, for example via a web browser program, a view as illustrated in FIG. 7 in which a dashboard 710 having components or objects such as 715 and 725. This permits a user to view monitoring data and control information using dashboard 710. Further, components 715 and 725 are interactive and may be used to view, edit or create control custom objects and workflows, as described herein. In the example of FIG. 7, dashboard component 715 provides monitoring data related to a water flow sensor for a water collection installation. Dashboard component 725 illustrates monitoring data indicative of the state of an industrial machine in the nature of a meter.

Figure 8:
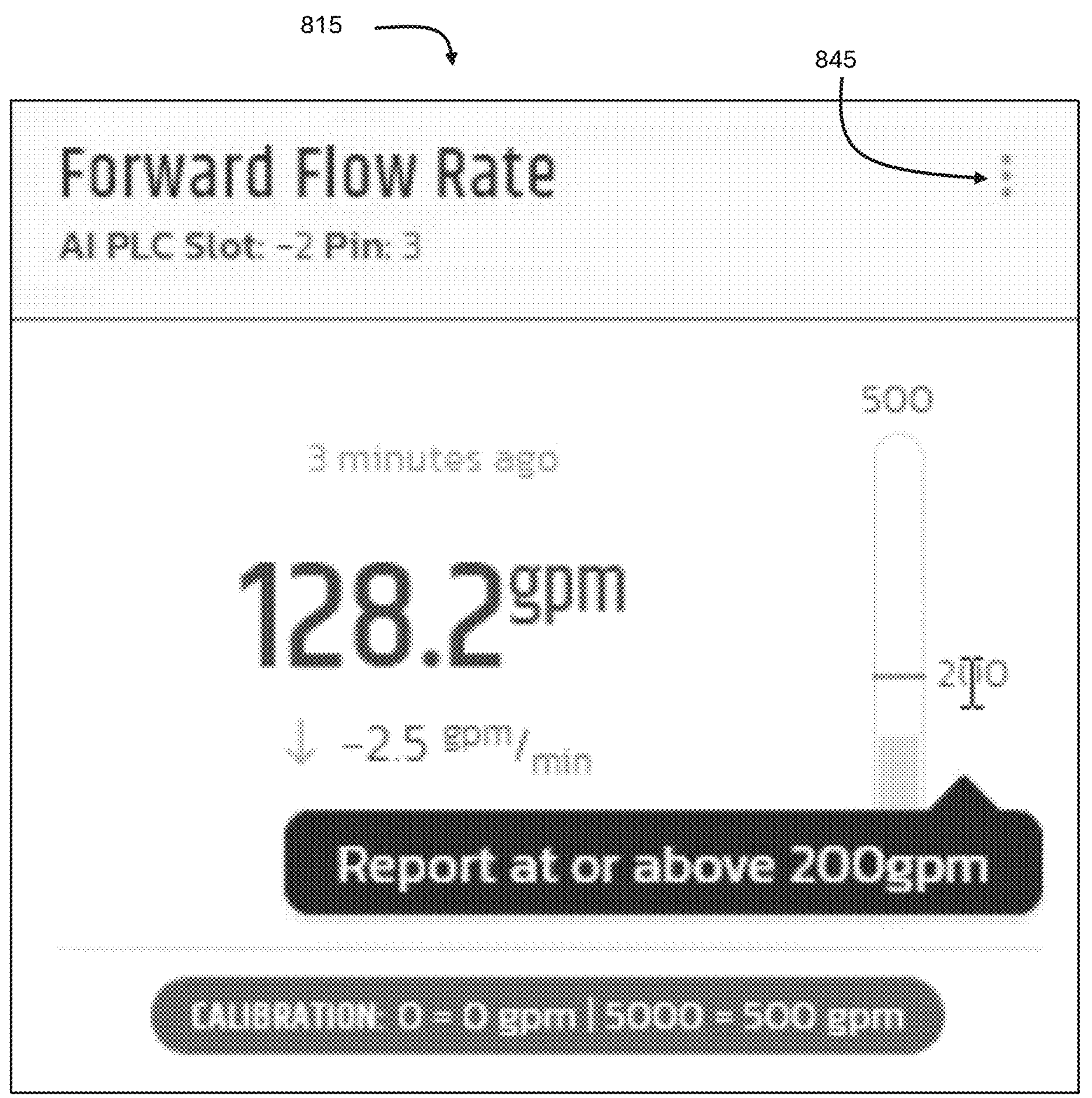
FIG. 8 illustrates an example dashboard component or object according to an embodiment.

Shown in FIG. 8 is an enlarged view 815 in the form of an interactive card of dashboard component or object 715. Here, dashboard component 815 comprises a custom object for providing monitoring data related to a water flow sensor and related control program associated therewith, i.e., report at or above a flow rate of 200 gallons per minute (gpm). The monitoring data may be utilized, for example by a human reviewer or a control program automation, to ascertain whether the flow rate is acceptable or predicted to be so in view of the contextual data, e.g., a storm projection or flood advisory for the geographic location associated with the flow sensor's geographic location. As indicated, a user may interact with dashboard component 815, as indicated by interactive element 845, to obtain further data and input control configurations, for example access to custom object configuration area 210, permitting updating of the control logic, configured threshold values, change data units used, etc.

Figure 8A:
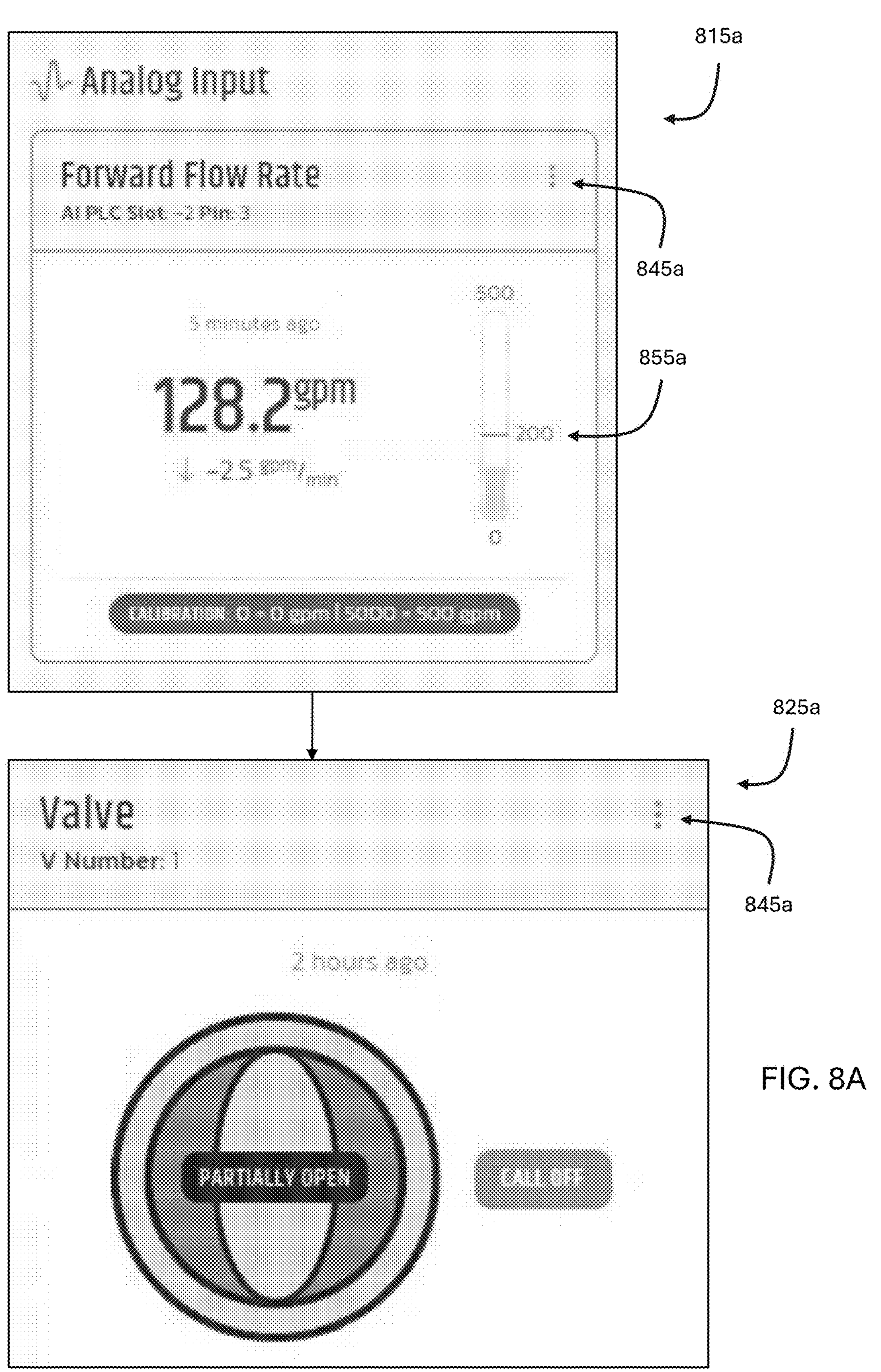
FIG. 8A illustrates an example of a workflow according to an embodiment.

A user may form workflows using one or more custom objects, as described herein. By way of example, FIG. 8A illustrates an example control workflow according to an embodiment. Here, a first 815*a* and a second 825*a* dashboard component or object are connected logically in order, for example in a workflow designer provided by an embodiment, as described in connection with FIG. 2. In a first case, an analog input such as flow rate of a monitored industrial machine (i.e., flow rate sensor) represented by dashboard component 815*a* is used along with a configurable threshold 855*a* of 200 gpm to determine a condition of a workflow. In this example, the workflow conditions a valve's operational state, as represented by dashboard component 825*a*. As may be appreciated, logic and instructions may be entered by the user as configuration parameters, for example entered via interacting with an interaction element of each dashboard 815*a*, 825*a*, collectively indicated at 845*a*. For example, a user may interact with dashboard component 815 to define a custom object to set a threshold, e.g., threshold 855*a*, and related outputs. Similarly, a user may interact with dashboard component 825 to set an operational state dependent on an input received. A user may link or associate one object's output with another's input in a flow designer, for example using a graphical or low code programming interface that permits graphical element linkages to be converted into coded instructions of a control program.

Figure 8B:
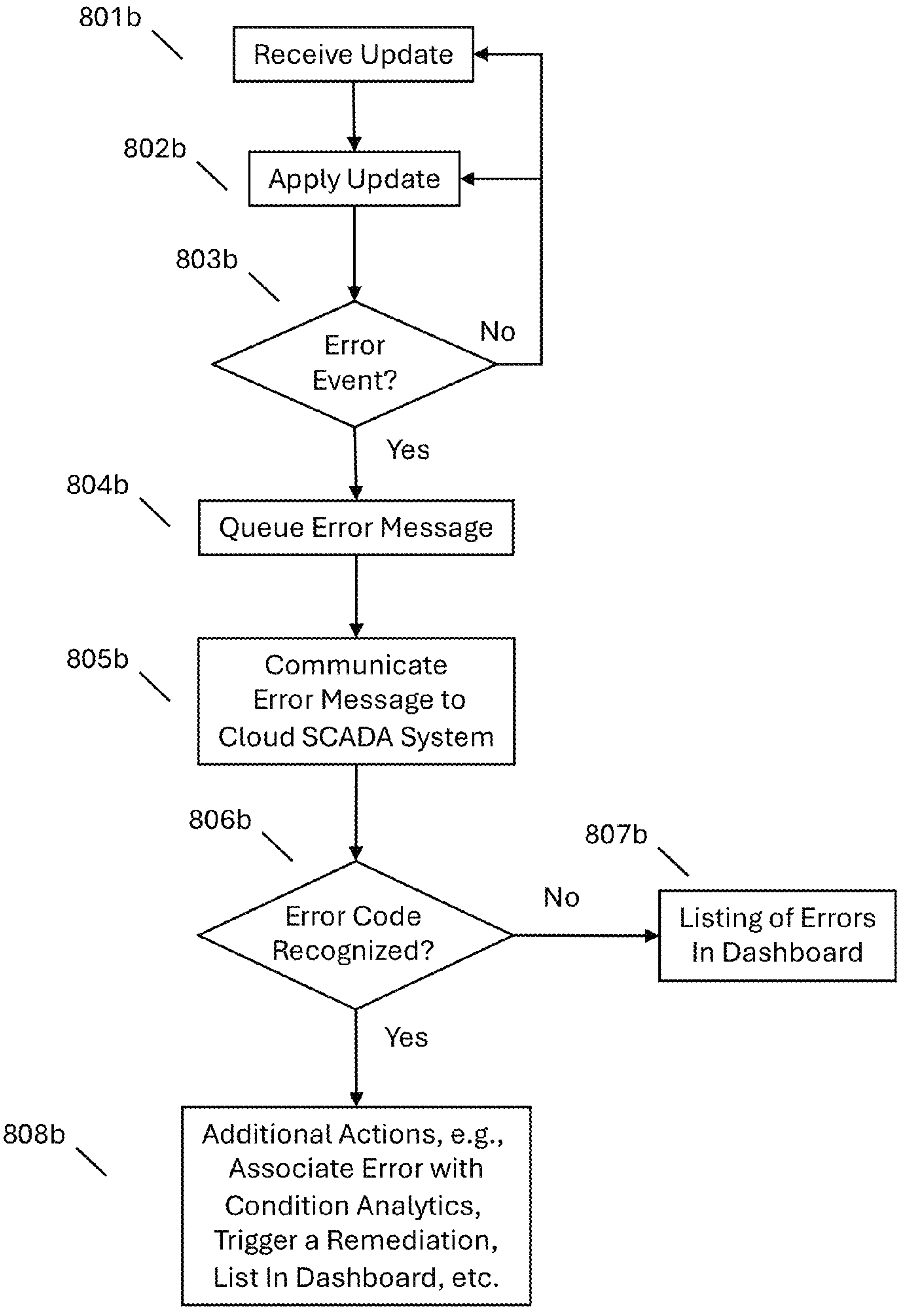
FIG. 8B illustrates an example error logging and analysis workflow according to an embodiment.

FIG. 8B shows an embodiment of a method for error analysis and remediation of one or more remote terminal units (RTUs) of a SCADA system. The method can be implemented by a set of one or more processors within the SCADA system, for example included in an RTU, a cloud-based server or controller of the SCADA system, or a combination of the foregoing.

Illustrated in connection with 801*b*, an embodiment receives an update, for example at an RTU to be configured to operate with a new custom object, etc. This update may include new configurations, software patches, or other relevant data intended to enhance or change the functionality of the RTU. By way of example, in an embodiment, an RTU may receive a custom object update and dynamically allocate reserved memory of the RTU to accept the update. At step 802*b*, the received update is applied to the RTU. For example, this step may be used to dynamically allocate memory of the RTU to apply an update, for example stored in an SD card of other flash memory of the RTU, allowing the RTU to operate with the configurations and software versions supplied by the update.

As indicated at 803*b*, the method determines whether an error event has occurred. This involves monitoring the RTU associated data in messages for any anomalies or issues that may arise during or after the update process. For example, an error may be encountered if a telemetry message is received during an update, an error may be encountered if the RTU targeted for update does not have or loses network connectivity (e.g., cellular network connectivity), loses power, etc.

At 804*b*, if an error event is detected, an embodiment queues an error message, for example in a queue of the RTU, a corresponding queue in the cloud-based SCADA system, etc. In one example, the queuing may include storing the error code along with other data, for example telemetry data, in a persistent memory such as an SD card, which errors are later queued to a middleware queue of the RTU for communication. This may be advantageous where, for example, the RTU loses connectivity to a central controller such as resident in the cloud-based SCADA system or loses power temporarily and must store error and other data for later delivery. Such an SD card queueing technique may also be applied as part of a power-savings schedule, where batches of messages are queued and stored persistently to an SD card and communicated in a coordinated fashion.

In an embodiment, one or more messages contains details about the error, for example including the type and any relevant data that can assist in diagnosing the issue. In an embodiment, the error message may include an error code supplied, for example, by the industrial machine (e.g., telemetry message code), a PLC or local network device such as a router, or the larger network (e.g., cellular network, cloud network, or the Internet).

Shown at 805*b*, an embodiment communicates the queued error message to the cloud SCADA system, for example where the error message is first queued at the RTU. This step ensures that the error information is transmitted to a centralized location for further analysis and remediation. In an embodiment, the error message may be communicated to a queue of the cloud-based SCADA system by another entity, such as a network device as described herein.

Indicated at 806*b*, an embodiment checks whether the error code is recognized. This involves comparing the error code against a database of known error codes to determine if the error code matches any predefined errors or conditions. By way of example, historical error codes may be created and maintained by a SCADA operator and stored in the cloud-based SCADA system or related database. In this way, a storage of error code knowledge, including annotations manually entered, predetermined error analysis supplied by a device maker or third party, etc., may be stored for subsequent analysis.

In an embodiment, one or more messages including error codes as used herein include related data, which may be used in combination to recognize the error code. For example, messages (even if not errors) may be used in combination with error codes, such as those related in time with a typical error code, the collection of which is treated as an error code or error code signature. Data included broadly in error codes or error code signatures used for analysis by an embodiment therefore include device type specific error codes, socket information, port information, which interface was used (cellular, ethernet, etc.) and the like. As may be appreciated, recognizing the error code at 806*b* allows a SCADA operator to get back to a customer operating the industrial machine, PLC network, RTU, etc., about what the problem is. By way of example, a received error code of 0 associated with a job accepted code related in time with the 0 error code points to or may be associated with a memory leak, for example the RTU started with too low of memory allocated for an update job. Such an error code may be remediated with a remediation workflow, for example to dynamically allocate more memory on the RTU, transition it to a lower power mode proactively ahead of an update retry, etc.

At 807*b*, if the error code is not recognized, an embodiment may list the error, for example in the dashboard for review an annotation by an operating user. For example, this allows operators to manually review and address an unrecognized error. Such errors and related data may be added to a store of historical error data, for example to be used in training an anomaly detection model, an error recognition model, etc., which may be provided and used as part of recognizing an error as indicated at 806*b*.

As shown at 808*b*, if the error code is recognized, an embodiment may take additional actions, for example associate the error with condition analytics such as descriptive details regarding the error code, trigger a remediation process as part of a workflow, such as retrying a custom object update workflow with changed configurations to address the error code, listing the error in the dashboard, generate an alert to an endpoint such as a field technician or cloud-based SCADA operator email or mobile device notification, or combinations of the foregoing. Such additional actions facilitate prompt error recognition and remediation using predefined remediation strategies. Further, the errors may be documented for future reference.

An embodiment therefore provides for defining and deploying custom objects to RTUs of a cloud-based SCADA system. In various embodiments, custom objects permit the user to more easily accommodate additional industrial machines, such as large sets of new or different machines to be incorporated into an existing cloud-based SCADA system. In some embodiments, templates or low code assistance is provided to further facilitate the definition and deployment of custom objects throughout the network. Further, embodiments may be used to provide automated, semi-automated, or manual error reporting, analysis and remediation. Such error reporting, analysis and remediation techniques permit a cloud-based SCADA operator to accommodate large sets of diverse industrial machines, RTU configurations, and error handling processes more easily.

Figure 9:
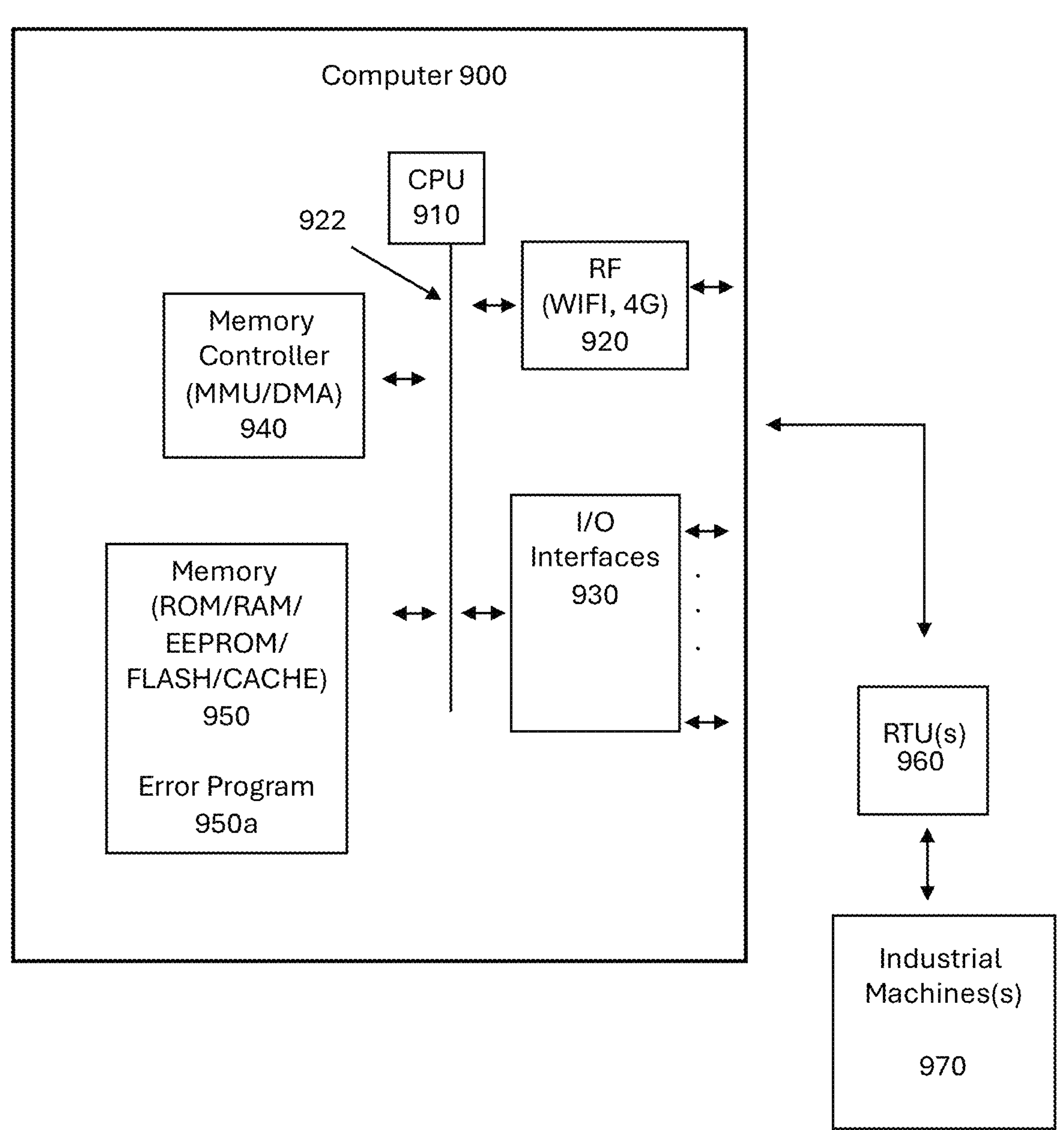
FIG. 9 illustrates an example system according to an embodiment.

It will be readily understood that certain embodiments can be implemented using any of a wide variety of devices or combinations of devices. Referring to FIG. 9, an example device that may be used in implementing one or more embodiments includes a computing device (computer) 900, for example included in or operatively coupled to a cloud server of a SCADA system or component thereof.

The computer 900 may execute program instructions or code configured to capture, store, and process data, e.g., error reporting, analysis and remediation, and perform other functionality of the embodiments. Components of computer 900 may include, but are not limited to, a processing unit 910, which may take a variety of forms such as a central processing unit (CPU), a graphics processing unit (GPU), a combination of the foregoing, etc., a system memory controller 940 and memory 950, and a system bus 922 that couples various system components including the system memory 950 to the processing unit 910. The computer 900 may include or have access to a variety of non-transitory computer readable media. The system memory 950 may include non-transitory computer readable storage media in the form of volatile and/or nonvolatile memory devices such as read only memory (ROM) and/or random-access memory (RAM). By way of example, and not limitation, system memory 950 may also include an operating system, application programs, other program modules, and program data. For example, system memory 950 may include an error reporting, analysis and remediation program 950*a* as described herein. Data may be transmitted by wired or wireless communication, e.g., to or from computer 900 to another device, e.g., RTUs 960 and/or industrial machines 970.

A user can interface with (for example, enter commands and information) the computer 900 through input devices such as a touch screen, keyboard, keypad, etc. A monitor or other type of display screen or device can also be connected to the system bus 922 via an interface, such as interface 930. The computer 900 may operate in a networked or distributed environment using logical connections to one or more other remote computers or databases. The logical connections may include a network, such local area network (LAN) or a wide area network (WAN) but may also include other networks/buses.

It should be noted that various functions described herein may be implemented using processor executable instructions stored on a non-transitory storage medium or device. A non-transitory storage device may be, for example, an electronic, electromagnetic, or semiconductor system, apparatus, or device, or any suitable combination of the foregoing. More specific examples of a non-transitory storage medium include the following: a portable computer diskette, a hard disk, a random-access memory (RAM), a read-only memory (ROM), an erasable programmable read-only memory (EPROM or Flash memory), a portable compact disc read-only memory (CD-ROM), a solid-state drive, or any suitable combination of the foregoing. In the context of this document "non-transitory" media includes all media except non-statutory signal media.

Program code embodied on a non-transitory storage medium may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN) or the connection may be made through other devices (for example, through the Internet using an Internet Service Provider), through wireless connections, or through a hard wire connection, such as over a USB or another power and data connection.

Example embodiments are described herein with reference to the figures, which illustrate various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific elements are used in the figures, and a particular illustration of elements has been set forth, these are non-limiting examples. In certain contexts, two or more elements may be combined, an element may be split into two or more elements, or certain elements may be re-ordered, re-organized, combined or omitted as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for error analysis and remediation of one or more remote terminal units (RTUs) of a supervisory control and data acquisition (SCADA) system, comprising:

determining, using a set of one or more processors, an error associated with an RTU, wherein the error comprises an update error;

generating, using the set of the one or more processors, one or more error messages;

extracting, using the set of the one or more processors, an error code of the one or more error messages to identify an error type;

associating, using the set of the one or more processors, the error type with analytics data indicative of the update error; and triggering, based on the update error, a remediation workflow that attempts to retry an update workflow associated with the update error, wherein the remediation workflow modifies one or more configurations of the update workflow.

2. The method of claim 1, wherein the one or more error messages comprises an error signature.

3. The method of claim 2, wherein the error signature includes additional data related to the error code.

4. The method of claim 3, wherein the additional data is related to the error code by one or more of being related in time to the error code and being related by the update workflow associated with the error code.

5. The method of claim 4, wherein the associating comprises analyzing the error signature to determine one or more historical error codes.

6. The method of claim 5, wherein the one or more historical error codes comprises descriptive data relating a cause of the error code.

7. The method of claim 6, wherein the descriptive data comprises contextual data explaining the error code in relation to another non-error event presented as part of the analytics data.

8. The method of claim 5, comprising performing anomaly detection on the error code using a model trained on historical error codes.

9. A system for error analysis and remediation of one or more remote terminal units (RTUs) of a supervisory control and data acquisition (SCADA) system, comprising:

a set of one or more processors; and a memory storing code executable by the set of the one or more processors to:

determine an error associated with an RTU, wherein the error comprises an update error;

generate one or more error messages;

extract an error code of the one or more error messages to identify an error type; and associate the error type with analytics data indicative of the update error;

wherein:

the system comprises code executable by the set of the one or more processors to trigger, based on the update error, a remediation workflow that attempts to retry an update workflow associated with the update error; and the remediation workflow modifies one or more configurations of the update workflow.

10. The system of claim 9, wherein the one or more error messages comprises an error signature.

11. The system of claim 10, wherein the error signature includes additional data related to the error code.

12. The system of claim 11, wherein the additional data is related to the error code by one or more of being related in time to the error code and being related by the update workflow associated with the error code.

13. The system of claim 12, wherein to associate comprises analyzing the error signature to determine one or more historical error codes.

14. The system of claim 13, wherein the one or more historical error codes comprises descriptive data relating a cause of the error code.

15. The system of claim 14, wherein the descriptive data comprises contextual data explaining the error code in relation to another non-error event presented as part of the analytics data.

16. The system of claim 13, comprising code executable by the set of the one or more processors to perform anomaly detection on the error code using a model trained on historical error codes.

17. A computer program product for error analysis and remediation of one or more remote terminal units (RTUs) of a supervisory control and data acquisition (SCADA) system, comprising:

a non-transitory medium storing code executable by one or more processors to:

determine an error associated with an RTU, wherein the error comprises an update error;

generate one or more error messages;

extract an error code of the one or more error messages to identify an error type;

associate the error type with analytics data indicative of the update error;

trigger, based on the update error, a remediation workflow that attempts to retry an update workflow associated with the update error, wherein the remediation workflow modifies one or more configurations of the update workflow.

18. The computer program product of claim 17, wherein the one or more error messages comprises an error signature, and wherein the error signature includes additional data related to the error code.

19. The computer program product of claim 18, wherein the additional data is related to the error code by one or more of being related in time to the error code and being related by the update workflow associated with the error code.

20. The computer program product of claim 19, wherein to associate comprises analyzing the error signature to determine one or more historical error codes.

* * * * *